W. SIMONSSON.
WEIGHING SCALE.
APPLICATION FILED JULY 28, 1908. RENEWED JUNE 19, 1917.
1,254,369.
Patented Jan. 22, 1918.
3 SHEETS—SHEET 1.
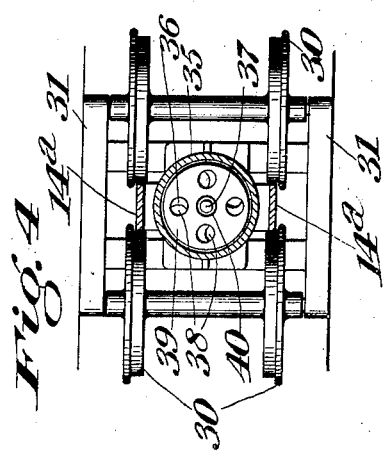
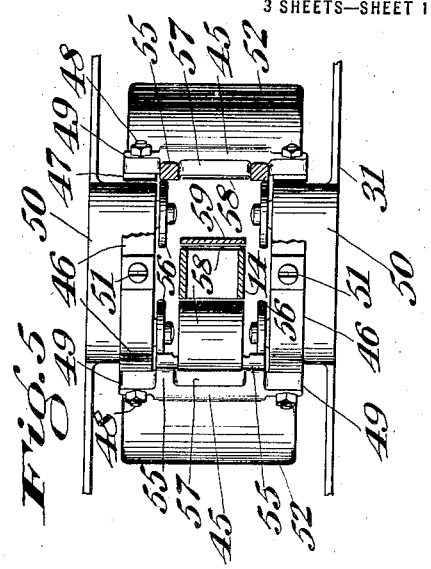
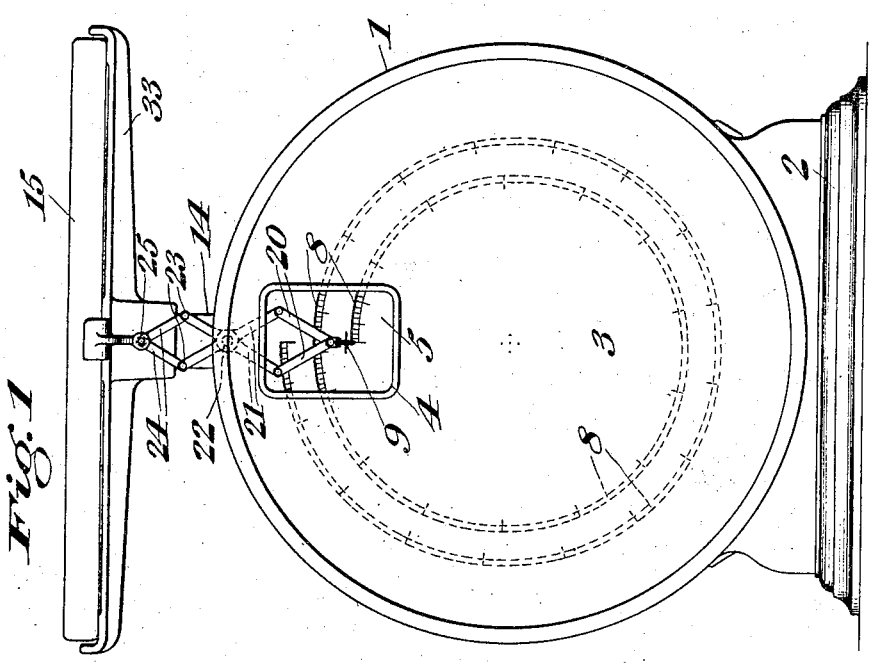
WITNESSES:
INVENTOR
Wilhelm Simonsson
BY
ATTORNEY W. SIMONSSON.
WEIGHING SCALE.
APPLICATION FILED JULY 28, 1908. RENEWED JUNE 19, 1917.
1,254,369.
Patented Jan. 22, 1918.
3 SHEETS—SHEET 2.
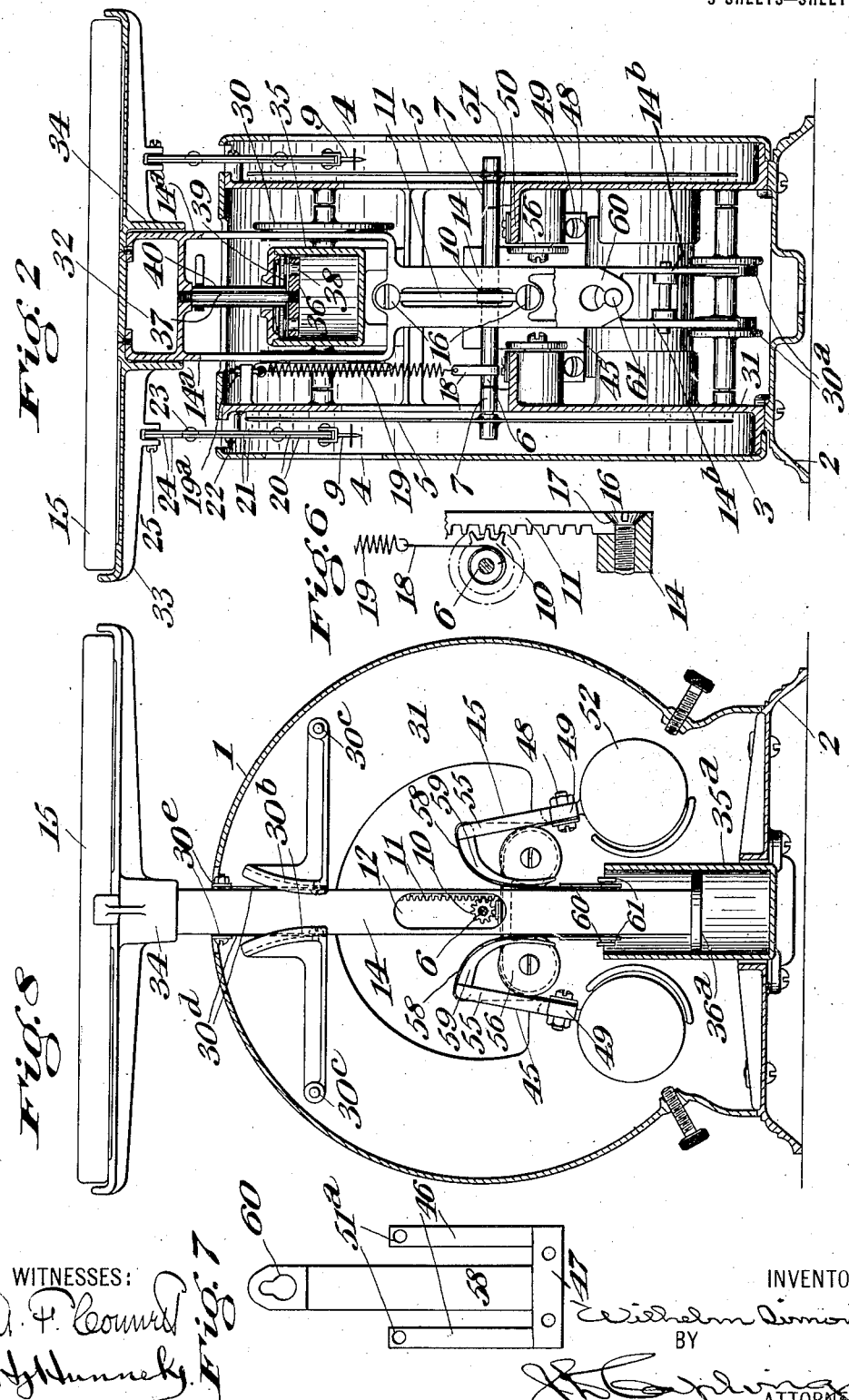

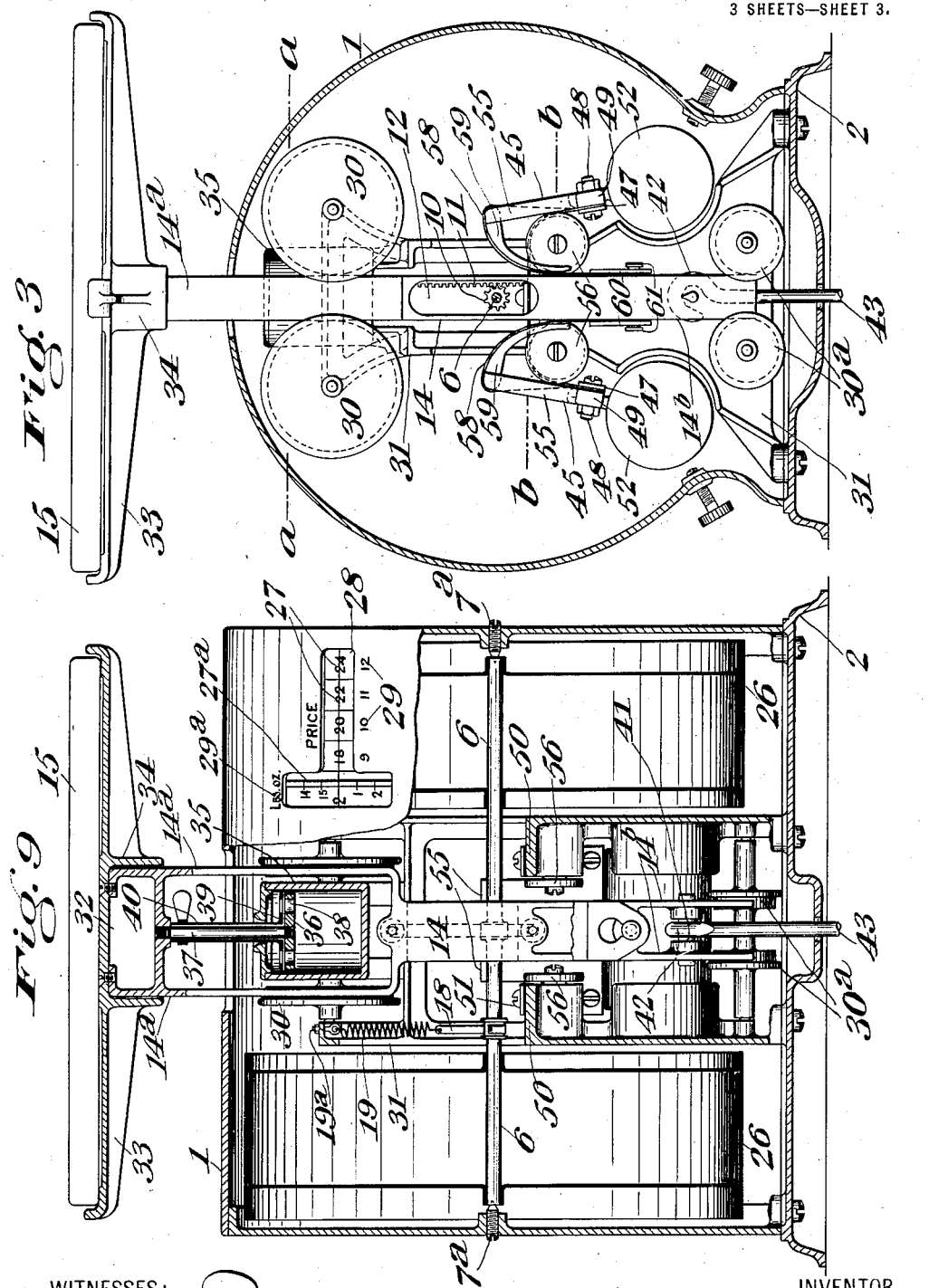

UNITED STATES PATENT OFFICE.

WILHELM SIMONSSON, OF NEW YORK, N. Y.

WEIGHING-SCALE.

1,254,369.  Specification of Letters Patent.  Patented Jan. 22, 1918.

Application filed July 28, 1908, Serial No. 445,686. Renewed June 19, 1917. Serial No. 175,712.

*To all whom it may concern:*

Be it known that I, WILHELM SIMONSSON, a subject of the King of Sweden, and a resident of the city, county, and State of New York, have invented certain Improvements in Weighing-Scales, of which the following is a specification.

This invention relates to certain improvements in weighing scales, and has for its object, in part, to provide a novel and improved index mechanism for use in connection with such scales, whereby a considerably increased range is afforded therein without excessive increase in the dimensions of the dial; in part, to provide a novel and improved arrangement of price indicating means adapted for use in connection with such weighing scales, and in part, to provide a weighing scale having weighing mechanism of an improved and simplified construction, whereby material advantages and convenience are attained in the construction and operation of the device.

The invention consists, in part, in a scale having index mechanism comprising a member mounted for turning movement and provided with a series of graduations in curved arrangement thereon, an index adapted to traverse such graduations when the index member is moved, and means for moving said index relatively to the rotative axis of such index member to compensate for the curvature of said series of graduations thereon.

Another part of the invention consists in a weighing scale having price indicating means comprising a price indicating member mounted for turning movement and provided with price graduations adapted in the movement of such member to be brought in registry with an index device, a member mounted for reciprocatory movement in unison with the weighing appliances, and means for communicating the reciprocatory movement of such member to the price indicating member to turn the same.

Another part of the invention consists in a weighing scale comprising a draft rod or member capable of endwise movement during the weighing operation, weighing and index mechanism operatively connected with said draft rod or member, and guide members mounted for turning movement and arranged for rolling contact upon said draft rod or member when the same is moved endwise in such a manner as to guide and support the same during such movement with a minimum of loss from friction and vibratory movement of the parts.

The invention also consists in a weighing scale having a draft rod or member capable of endwise movement during the weighing operation, and provided with weighing mechanism comprising a pendulating weighted lever having a curved part adapted, when the lever is moved, to traverse a path in parallelism with the movement of said draft rod or member, and a connection between such curved part of the lever and said draft rod or member for compelling movement of the parts in unison.

The invention also contemplates certain novel features of the construction, and combinations and arrangements of the several parts of the improved weighing scale, and of the index mechanism and price indicating means, whereby certain important advantages are attained, and the device is rendered simpler, less expensive, and otherwise better adapted and more convenient for use, all as will be hereinafter fully set forth.

The novel features of the invention will be carefully defined in the claims.

In order that my improvements may be the better understood, I have illustrated in the accompanying drawings several forms of weighing scale constructed in accordance with my invention, in which drawings—

Figure 1 is a side elevation illustrating certain features of the index mechanism comprised in my present invention;

Fig. 2 is an axial section taken vertically through the form of weighing scale illustrated in Fig. 1, and showing certain features of the index mechanism together with certain novel parts of the inclosed mechanism which will be hereinafter referred to;

Fig. 3 is a vertical sectional view taken in a plane at right angles to the plane of the section in Fig. 2;

Fig. 4 is a sectional plan view taken through the casing of the weighing scale in the plane indicated by line *a—a* in Fig. 3, and showing certain features of the means for guiding the reciprocatory draft rod or member;

Fig. 5 is a transverse sectional view taken through the weighing mechanism in the plane indicated by the line *b—b* in Fig. 3;

Fig. 6 is an enlarged fragmentary detail view showing certain features of the means for operating the index mechanism from the draft member;

Fig. 7 is a detached detail view showing a construction of flexible suspending means for suspending the pendulating lever of the weighing mechanism and actuating the same from the draft member;

Fig. 8 is a view somewhat similar to Fig. 3, but illustrating a modified formation of the means for guiding and retarding the movement of the draft member, and—

Fig. 9 is a view somewhat similar to Fig. 2, but illustrating an embodiment of the improved price indicating means comprised in the present invention.

Referring primarily to Figs. 1 to 7, inclusive, the improved weighing scale is therein illustrated as provided with a cylindrical casing 1 having a flattened base portion 2 adapted to be rested upon a counter or the like, although it will be evident that my improvements are not limited in their application to counter-scales, but are capable of being embodied in weighing devices of various kinds with equally good results.

As shown in these views, the opposite ends of the cylindrical casing 1 are provided with end walls 3 of flattened nature, provided at their upper parts with sight apertures 4, and within the casing and in close proximity to said flattened ends 3, 3 thereof, are arranged disk-like index members 5, 5, secured in balanced condition upon the opposite ends of a horizontally extended shaft 6, which is journaled in suitable bearings 7, 7 produced upon spaced inner frame members 31, 31. The outer surfaces of the respective disk-like index members 5, 5, are provided with series of graduations adapted for indicating weight and these graduations are arranged in the form of a volute curve, as clearly shown at 8 on Fig. 1, so that the several graduations of each such series are adapted, when the shaft 6 carrying the members 5, 5 is turned, to pass in succession across the sight apertures 4, 4 of the respective ends 3, 3 of the casing.

In connection with each index member 5, an index 9 is provided which is adapted, during the turning movement of the corresponding index member, to be moved radially with respect thereto, in such a manner as to be caused to conform at all times to the volute curvature of the series of graduations 8 marked upon such index member, and as herein shown each such index 9 is carried a toggle-like device comprising the lower connected links 20, 20, the upper ends of which have pivotal connection with the lower pendent ends of toggle-levers 21, 21, pivoted as shown at 22 in the upper part of the casing, with upper ends pivotally connected as seen at 23 with the lower ends of upper links 24, 24, which are in turn, as herein shown, connected at 25 with a pan or platter 15 adapted to receive and support an article to be weighed in a well known manner.

As shown herein, this pan or platter 15 is supported upon the upper extremity of a draft rod or member 14, so as to stand above the top of the casing 1, and the said draft rod or member 14 is extended down within the interior of said casing and is therein connected with counterbalancing means whereby the said platter or pan 15 is normally upheld. Said draft rod or member 14 is thereby rendered capable of reciprocatory movement in a vertical direction within the casing 1, and such reciprocatory movement is communicated, as will be hereinafter explained, to turn the shaft 6 and index members 5, 5 thereon, whereby it will be seen that the graduations of each volute series 8 are caused to play across the sight apertures 4, 4 past the indices 9, 9, which latter, being connected with the pan or platter 15 through the toggle-like connecting device above described, are thereby moved in radial directions with respect to the index members or disks 5, 5, so as to conform, during the entire movement of said members 5, with the volute curvatures of the graduations 8, 8 thereon.

As herein shown, the draft bar or member 14 has a vertically extended slotted opening 12 through which the shaft 6 is extended, and at one side of said opening 12 a vertically extended rack bar 11 is secured upon the draft bar or member 14 in such a manner that its teeth are in mesh with those of a pinion 10 carried upon the central part of shaft 6, whereby the movement of the reciprocatory draft bar or member 14 is communicated to rotate the shaft 6 carrying the index disks or members 5, 5. 18 represents a flexible band or strip of metal, one end of which is affixed in any preferred manner to the shaft 6 so as to be adapted to be wound thereon, as shown in Figs. 2 and 6, when said shaft is turned during the weighing operation, and the opposite end of this strip or band 18 has connection with the lower end of a spiral or other spring 19, adjustably mounted as shown at 19ª at its upper end. The tension of this spring 19 is very slight, being only sufficient to prevent chattering of the intermeshing gear teeth and consequent irregular movement of the index members 5, 5, whereby the latter are compelled to travel in a uniform and regulated manner past the indices 9, 9.

As a further means for preventing such looseness or chattering of the intermeshing gear teeth, particularly after the same have become worn down, and also as a means for adjusting the index members 5, 5 with relation to the draft bar or member 14 to an extent sufficient to cause the indices 9, 9 to conform to the zero points upon the graduated scales 8, 8, I secure the opposite upper and lower ends of the rack bar 11 to the draft bar or member 14 by means of screws 16, 16, having beveled parts adapted for engagement with similarly beveled surfaces 17, produced at the said upper and lower ends of said rack bar 11. Where such means are employed, it will be seen that by adjusting the screws 16, 16 relatively to each other and to the draft bar or member 14, the rack bar 11 may be moved vertically, to cause the index members 5, 5 to assume proper positions relatively to the indices 9, 9. The construction also permits of readily removing and replacing the rack bar when desirable.

In Fig. 9 I have illustrated an embodiment of the price indicating means comprised in this present invention. As shown in this view, the casing 1, draft bar or member 14 and pan or platter 15 are arranged similarly to the corresponding parts above referred to, but the shaft 6 is journaled at its extremities upon pins 7ª, at opposite ends of the casing. The said casing is also made sufficiently large to receive within its opposite ends the cylindrical price indicating members 26, 26, secured upon opposite ends of shaft 6, and each provided, upon its perimetral surface, with a plurality of annular price graduations 27, 27, in addition to an annular series of weight indicating graduations 27ª, these graduations 27 and 27ª being visible in a well known way at an aperture 28 in the perimetral wall of the casing, which latter is suitably marked with the different units of price and weight, as shown at 29 and 29ª on the drawing. The shaft 6 will preferably be driven directly from the draft bar or member 14, for which purpose I have indicated upon the drawing in dotted lines, the rack bar and pinion device above described and shown in Fig. 6 of the drawings.

Where the price indicating member is thus directly driven from the draft bar or member, it will be evident that an extremely accurate indication will be afforded by reason of the practical elimination of loss through friction and wear of the parts, and of the balanced condition of the rotatory indicating member attained in this manner. This same advantage is also attendant upon the construction wherein the index members 5, 5 are carried upon the shaft 6 and the latter is driven directly from the reciprocatory draft bar or member as above described.

The present invention also comprises the employment of means to insure the reciprocatory movement of the draft bar or member with as little friction and wear and vibration as possible, and of such means I have shown an embodiment in Figs. 2, 3, 4 and 9, wherein the upper and lower parts of said draft bar or member 14 are provided with spaced guide surfaces 14ª, 14ª, and 14ᵇ, 14ᵇ, which, in the reciprocatory movement of the draft bar or member are adapted to travel in close contact with guide rollers or members 30, 30 and 30ª, 30ª, which are mounted for rotatory or turning movement upon the frame members 31 within the casing 1 and have their peripheral surfaces adapted for rolling contact upon the opposite surfaces of the draft rod or member 14 in such a manner as to compel rectilinear movement thereof with a minimum of friction and wear, and to effectively prevent vibratory or lateral swaying movement of said bar or member. As shown in the drawings, the guide members or rollers 30 and 30ª are also flanged upon the perimetral surfaces, and such flanges serve to prevent play of the draft bar or member across the peripheral surfaces of said guide members.

In Fig. 8 I have illustrated another embodiment of the means for guiding the reciprocatory draft bar or member 14, wherein sector shaped guide members 30ᵇ, 30ᵇ are arranged for rolling contact at opposite sides of said draft bar or member, being pivotally supported upon the inner frame member 31 as clearly shown at 30ᶜ, 30ᶜ on the drawing. The perimetral surfaces of these guide members are flanged similarly to the rollers 30 and 30ª in the construction previously described, and flexible tapes or metal suspenders 30ᵈ, 30ᵈ are interposed at opposite sides of the draft bar or member, between the same and the perimetral surfaces of said pivoted guide members 30ᵇ, 30ᵇ, the upper ends of said tapes or suspenders having connection as shown at 30ᵉ, 30ᵉ on the drawing, with the draft bar or member 14, while their lower ends have similar connection with the guide members and serve to support these latter in rolling contact with opposite sides of the draft member.

The present invention also comprises the employment of means for retarding the rectilinear, reciprocatory movement of the draft bar or member, so as to prevent needless and excessive oscillation of the parts during the weighing operation, and in Figs. 2, 3, 4 and 9 I have shown one embodiment of such means, consisting of a dash-pot 35, supported upon the inner frame member 31 within the casing 1, and provided with a piston 36 connected by means of a vertically extended stem 37 to move in unison and alinement with the draft bar or member 14, this arrangement affording an air cushion for effectively retarding vibratory or oscillatory movement of the parts during weighing. For the escape of the air from the dash pot 35, the piston 36 has ports 38, controlled by means of a valve 39 superposed upon the piston, and connected with a sleeve 40 arranged to turn on the stem 37 and provided with a handle so that such valve may be conveniently adjusted.

To insure the alinement of the dash pot retarding device above described with the travel of the draft bar or member 14, and thereby prevent binding of the parts such as might interfere with accuracy of the improved weighing scale, I have shown the dash pot arranged between the spaced upper guide surfaces 14$^a$, 14$^a$ of the draft bar or member, and the stem or rod 37 alined with the axis of said draft member.

Another embodiment of this retarding means is illustrated in Fig. 8, wherein a dash pot 35$^a$ is located in the casing below and in alinement with the draft member 14, and in position to receive a septum 36$^a$ carried upon the lower end of the draft member. Where this arrangement is employed, it permits of dispensing with lower guide members, such as are shown in Figs. 2, 3 and 9, since the dash pot affords an effective guiding means for the lower end of the draft member.

In order to adapt the device herein illustrated for employment as a platform scale without material change of the parts, I have, in Figs. 2, 3 and 9, shown the lower end thereof provided with a transverse tie 41, extended between the lower spaced guide surfaces 14$^b$, 14$^b$ in position for engagement with a hook 42 carried by a draft rod or link 43, which may serve as a means for connecting a platform with the draft member 14.

The construction of the improved weighing scale wherein the reciprocatory draft bar or member is employed is particularly well adapted for use in connection with pendulum scales and especially with that class of such devices of which the scales shown and claimed in my prior pending patent applications, Serial No. 322,709, filed June 21, 1906, and Serial No. 387,144, filed August 5, 1907, are types, and this arrangement is also comprised in the present invention and illustrated in the accompanying drawings.

As shown herein, two pendulating levers 45, 45 are provided, spaced apart and reversely arranged for pendulating movement at opposite sides of the draft bar or member 14, the said levers having their lower ends weighted, as shown at 52, and arranged to depend, normally, within correspondingly formed recesses at opposite sides of the frame member 31, and having their upper ends provided with arms 59, 59, directed toward the opposite sides of the draft bar or member and provided with cycloidal curved surfaces adapted, during the movement of the parts, to travel in close proximity to the said opposite surfaces of the draft member in such a manner as to guide the same and effectively check vibratory movement. The said cycloidal curved surfaces of the arms or extensions 59 of the respective levers 45, 45, are traversed by flexible tapes or connectors 58, 58, herein shown as made in the form of flexible metal strips, each of which has connection as will be hereinafter explained, with the corresponding lever 45, and is passed downwardly around the cycloidal surface of the extension 59 and has its lower end provided with an attached reinforce or thickened part 60, provided with a key-hole aperture adapted to be detachably engaged upon a headed stud 61 protruding from the draft bar or member 14.

Each lever 45 has its opposite side portions 55, 55 arranged for contact upon rolling fulcrum disks or parts 56, 56 held to turn upon the inner frame member 31, and is apertured between such side portions 55, 55, as clearly shown at 57 in Fig. 5, the corresponding connector 58 being extended from the top of the extension 59 through such aperture 57, as shown in dotted lines in Figs. 3 and 8, so as to be capable of being secured upon the side of the lever 45 adjacent to the rolling fulcrum disks 56, 56.

The inner frame member 31 has integral curved parts 50, 50, the curvature of which is concentric with the fulcrum disks 56, 56, but is slightly less in radius than such disks, and each such curved part 50, carries a screw 51 arranged at its central upper part, and serving for the attachment of the upper ends 51$^a$ of flexible suspenders 46, 46, herein shown as made in the form of thin metal tapes or strips, the lower ends of which are connected with the sides of the levers 45, 45, at points outside of the fulcrum disks 56, so as to support such levers for pendulating movement upon said disks without contacting with the latter.

In practice it is sometimes preferable to unite the suspenders 46, 46 at opposite sides of each lever with the connector 58 at the central part of the lever by means of a reinforce or thickened portion 47, as shown in Fig. 7 which affords a suitable degree of strength so that bolts or screws 48 may be passed through the suspenders and connector and through the lever 45 for holding the parts in relation.

At the points of attachment of the suspenders 46, 46 with levers 45, the latter are provided with outwardly directed lugs or projections 49, 49 and above these lugs or projections, the levers are apertured, as shown at the right hand side of Fig. 5, after which, the plate or reinforcement 47 being positioned upon the inner side of each lever, the corresponding connector 58 is passed outwardly through the aperture of the appropriate lever, as indicated at 57 in Fig. 5 and in dotted lines in Fig. 3, so that it may traverse the cycloidal curved surface of the arm or extension 59. By this arrangement, contact of the levers 45 upon the outer surfaces of the suspenders 46 where the latter are passed over the curved portions 50 of the frame is avoided.

Where the pendulating levers are arranged at opposite sides of the draft member with the extensions traveling in close proximity thereto, it is evident that an extremely compact and desirable construction is attained, and a further material advantage is secured in that comparatively short connectors are required for the connection of the pendulating levers with the draft bar or member, whereby variation in the length of such connectors, and consequent inaccuracy of the improved weighing scale is reduced to a minimum.

It will be evident from the above description of my improvements that the several features of the index mechanism, price indicating means, and of the weighing mechanism are susceptible of considerable modification without material departure from the principles and spirit of the invention, and for this reason I do not desire to be understood as limiting myself to the precise formation and arrangement of the several parts herein set forth in carrying out my invention in practice.

Having thus described my invention, what I claim and desire to secure by Letters Patent is—

1. A weighing scale having an index member mounted for turning movement and provided with graduations eccentrically arranged upon it, a pointer adapted, in the turning of the graduated member, to traverse the graduations thereof, and means in controlling relation both to the index member and pointer, operable to turn the graduated index member, and to move the pointer toward and from the rotative axis of the graduated member during its turning movement, to compensate for the eccentricity of the graduations thereon.

2. A weighing scale having an index member mounted for turning movement and provided with graduations eccentrically arranged upon it, a pointer adapted, in the turning of the graduated member, to traverse the graduations thereof, a part arranged for movement under the influence of an article being weighed, having driving connections both with the index member and pointer operable to turn the graduated index member, and simultaneously to move the pointer toward and from the rotative axis of the graduated member during its turning movement, to compensate for the eccentricity of its graduations, and scale mechanism having independent connection with said part for controlling the movement thereof.

3. A weighing scale having an index member provided with eccentric graduations, an index adapted to traverse said graduated index member, and means for moving said index radially of said graduated member and along the graduations of the same, comprising pivotally mounted levers connected with the index and adapted, when the index is moved, to guide the same in a rectilinear direction.

4. A weighing scale having index mechanism including a shaft mounted to turn and provided with an eccentrically graduated index member, an index adapted to traverse the eccentric graduations of said graduated member during turning movement thereof, a reciprocatory part arranged for movement at one side of the shaft and in a direction transverse to the axis thereof, and adapted for connection with weighing mechanism, means actuated from said reciprocatory part and capable of operation to move the index radially across the graduated member when the same is turned, a connection extended from the reciprocatory part to said shaft to communicate the movement from said reciprocatory part to turn said shaft, weighing mechanism and means, other than said shaft driving connection and index actuating means, for communicating the movement of said reciprocatory part to the weighing mechanism.

5. A weighing scale comprising a reciprocatory part adapted for connection with weighing mechanism and provided with spaced guide surfaces, guide members engaged with said spaced guide surfaces and adapted to guide the reciprocatory part during movement thereof, and a dash pot retarding device arranged between the spaced guiding surfaces of the reciprocatory part and having one of its members fixedly connected with said part and operable to assist in guiding the same, and to retard the reciprocatory movement thereof.

6. A weighing scale comprising a reciprocatory part adapted for connection with weighing mechanism and provided with spaced guide surfaces, guide members at opposite sides of the reciprocatory part and having perimetral surfaces engaged for rolling contact upon the spaced guide surfaces of said part to guide the same during its movement, and a dash pot retarding device arranged between the spaced guide surfaces of the reciprocatory part and having one of its members fixedly connected with said part and operable to assist in guiding the same, and to retard the reciprocatory movement thereof.

7. A weighing scale including a reciprocatory draft member, a pendulating weighted lever having a curved extension directed toward, and adapted, when the parts are moved, to play in close proximity to the side of the draft member, a shifting fulcrum for said lever, a connection for operating the pendulating lever in unison with the movement of the draft member and extended between the draft member and said curved extension of the lever, and devices at opposite sides of said connection operable to guide the draft member during its reciprocatory movements.

8. A weighing scale including a reciprocatory draft member, pendulating weighted levers arranged at opposite sides of the draft member and provided with curved extensions directed toward the same and adapted, when the parts are moved, to play in close proximity to the opposite sides of said draft member, fulcra whereon said levers are supported for rolling contact, connections extended from the draft member to the curved extensions of the respective levers, for operating said levers in unison with the movement of the draft member, and means engaged with the draft member operable to guide the same during its reciprocatory movements.

9. A weighing scale comprising a curved fulcrum, a curved part concentric with and alongside the curved fulcrum, a pendulating weighted lever, adapted when moved, to traverse the curved fulcrum, a flexible suspender having its lower end connected at the side of the lever and its upper end passed over the curved part at the side of the fulcrum and out of contact with the lever, draft mechanism operatively connected with the lever, and index mechanism adapted for actuation in unison therewith.

10. A weighing scale having a reciprocatory part adapted for connection with weighing mechanism, a guide member mounted for turning movement and having a perimetral portion arranged for rolling contact with the reciprocatory part to guide the same during its movement, and means to compel turning movement of the guide member in unison with the movement of the reciprocatory part.

11. A weighing scale having a reciprocatory part adapted for connection with weighing mechanism, a guide member mounted for turning movement and having a perimetral portion arranged for rolling contact with the reciprocatory part to guide the same during its movement, and a flexible strip affording connection between the guide member and said reciprocatory part and operable to compel turning movement of the guide member in unison with the movement of the reciprocatory part.

12. A weighing scale having similarly curved fulcrum members in spaced relation, a pendulating weighted lever supported for rocking movement upon said spaced fulcrum members, suspending means for the lever, load receiving means having a flexible connection with said lever for imparting rocking movement thereto, and an extension for the lever adapted, when said lever is rocked, to traverse the space between said fulcrum members and having a curved surface wherewith said flexible connection has engagement, operable, when the lever is rocked, to compel rectilinear movement of said connection.

13. A weighing scale having a draft member capable of reciprocatory movement in a vertical direction, a load receiving means at the upper part of the draft member, a pendulating weighted lever capable of rocking movement in a plane alined with the lower part of the draft member and provided with a curved extension directed toward and connected with said lower part of the draft member and adapted, when the lever is rocked, to play closely adjacent to the draft member, and a curved fulcrum member whereon said lever is supported for rocking movement.

14. A weighing scale having a draft member capable of reciprocatory movement in a vertical direction, a load receiving means at the upper part of said draft member, balancing mechanism including levers at opposite sides of the draft member capable of movement in planes alined therewith and provided with curved extensions directed toward and connected with the lower part of the draft member and adapted, when the levers are rocked, to play closely adjacent to the sides of the draft member, and fulcrum devices whereon the respective levers are supported.

15. A measuring instrument having a load support, a plurality of pendulating levers adapted for conjoint pivotal movement under the influence of a load rested upon said support, independent fulcrum devices whereon the respective levers are supported for pivotal movement in unison with each other, and spaced frame members whereon said fulcrum devices are independently supported affording connection between said fulcrum devices to hold the same in relation during the operation of said levers.

In witness whereof I have hereunto signed my name this 20th day of July 1908, in the presence of two subscribing witnesses.

WILHELM SIMONSSON.

Witnesses:
ERIC V. TIDESTROM,
J. D. CAPLINGER.